(12) United States Patent
Alaboson

(10) Patent No.: US 11,441,013 B2
(45) Date of Patent: Sep. 13, 2022

(54) METHOD TO ADJUST THE ELONGATION REQUIRED TO EFFECT A COLOR CHANGE IN POLYMERIC STRETCH FILMS INCORPORATING MECHANOCHROMIC DYES

(71) Applicant: Dow Global Technologies LLC, Midland, MI (US)

(72) Inventor: Justice Alaboson, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 164 days.

(21) Appl. No.: 16/967,464

(22) PCT Filed: Mar. 13, 2019

(86) PCT No.: PCT/US2019/022042
§ 371 (c)(1),
(2) Date: Aug. 5, 2020

(87) PCT Pub. No.: WO2019/190749
PCT Pub. Date: Oct. 3, 2019

(65) Prior Publication Data
US 2021/0221978 A1    Jul. 22, 2021

Related U.S. Application Data

(60) Provisional application No. 62/649,676, filed on Mar. 29, 2018.

(51) Int. Cl.
*C08K 5/353* (2006.01)
*B29C 48/00* (2019.01)
(Continued)

(52) U.S. Cl.
CPC .............. *C08K 5/353* (2013.01); *B29B 7/88* (2013.01); *B29C 48/022* (2019.02); *B29C 48/10* (2019.02);
(Continued)

(58) Field of Classification Search
CPC ......... C08K 5/353; B29B 7/88; B29C 48/022; B29C 48/10; B29C 48/21; B32B 27/08;
(Continued)

(56) References Cited

U.S. PATENT DOCUMENTS 3,154,461 A    10/1964    Johnson
4,179,081 A    12/1979    Parry
(Continued)

FOREIGN PATENT DOCUMENTS

EP    3222694 A1    9/2017
WO    9414609 A1    7/1994
(Continued)

OTHER PUBLICATIONS

Pucci, A, et al. "Dichroic Properties of Bis(benzoxazolyl)stilbene and Bis(benzoxazolyl)thiophene Dispersed into Oriented Polyethylene Films: A Combined Experimental and Density Functional Theory Approach" J. Phys. Chem. Part B: 2006, 110(7), pp. 3127-3134.

(Continued)

*Primary Examiner* — Michael C Miggins

(57) ABSTRACT

The present disclosure relates a method to adjust the amount of elongation required to effect a color change in a polymer stretch film. A first aspect of the invention is a method which method comprises selecting a polyolefin resin having a given density; admixing a given amount of the AIE mechanochromic dye into a melt of the polyolefin resin; making a film of a desired thickness from the polyolefin resin containing the mechanochromic dye; determining the level of (Continued)

elongation needed to effect a color change in the resulting film; and adjusting the density of the polyolefin resin to change the level of elongation needed to effect the color change to the desired level.

13 Claims, 2 Drawing Sheets

(51) Int. Cl.
- B29C 48/10 (2019.01)
- B29C 48/21 (2019.01)
- B29B 7/88 (2006.01)
- B32B 27/08 (2006.01)
- B32B 27/20 (2006.01)
- B32B 27/32 (2006.01)
- B29K 105/00 (2006.01)
- B29L 31/00 (2006.01)

(52) U.S. Cl.
CPC .............. *B29C 48/21* (2019.02); *B32B 27/08* (2013.01); *B32B 27/20* (2013.01); *B32B 27/32* (2013.01); *B29K 2105/0032* (2013.01); *B29L 2031/712* (2013.01); *B32B 2307/4026* (2013.01); *B32B 2307/514* (2013.01); *B32B 2553/00* (2013.01)

(58) Field of Classification Search
CPC . B32B 27/20; B32B 27/32; B32B 2307/4026; B32B 2307/514; B32B 2553/00; B29K 2105/0032; B29L 2031/712
See application file for complete search history.

(56) References Cited

U.S. PATENT DOCUMENTS

| | | |
|---|---|---|
| 4,248,392 A | 2/1981 | Parry |
| 4,425,268 A | 1/1984 | Cooper |
| 4,514,955 A | 5/1985 | Mouser et al. |
| 4,522,348 A | 6/1985 | Strout et al. |
| 4,842,781 A | 6/1989 | Nishizawa et al. |
| 5,351,905 A | 10/1994 | Ferber |
| 5,985,389 A | 11/1999 | Dalton et al. |
| 6,534,166 B1 | 3/2003 | Pip et al. |
| 6,540,949 B2 | 4/2003 | Pip et al. |
| 6,824,864 B2 | 11/2004 | Bader |
| 8,468,778 B2 | 6/2013 | Windheuser |
| 8,569,208 B1 | 10/2013 | Ribi |
| 9,133,362 B2 | 9/2015 | Hickenboth et al. |
| 2009/0081474 A1 | 3/2009 | Keung |
| 2011/0132788 A1 | 6/2011 | Middlesworth et al. |
| 2012/0091699 A1 | 4/2012 | Krueger et al. |
| 2012/0219814 A1 | 8/2012 | Vignola et al. |
| 2012/0244779 A1 | 9/2012 | Cernohous et al. |
| 2013/0086874 A1 | 4/2013 | Liestman et al. |
| 2014/0013864 A1 | 1/2014 | Hickenboth et al. |
| 2018/0094127 A1 | 4/2018 | Alaboson et al. |

FOREIGN PATENT DOCUMENTS

| | | |
|---|---|---|
| WO | 2010036724 A1 | 4/2010 |
| WO | 2018064155 A1 | 4/2018 |

OTHER PUBLICATIONS

Pucci, A, et al. "Polymer composites with smart optical properties", Soft Matter, Jan. 27, 2011, 7(8) p. 3689.
PCT/US2017/053697, International Preliminary Report on Patentability dated Apr. 9, 2018.
PCT/US2017/053697, International Search Report & Written Opinion dated Nov. 14, 2017.
PCT/US2017/053702, International Preliminary Report on Patentability dated Apr. 2, 2019.
PCT/US2017/053702, International Search Report & Written Opinion dated Dec. 8, 2017.
PCT/US2019/022042, International Preliminary Report on Patentability dated Sep. 29, 2020.
PCT/US2019/022042, International Search Report & Written Opinion dated Jun. 6, 2019.
Dow Global Technologies, Inc., EP Appln. No. 06814361.9-1211, Rejection dated Nov. 14, 2008.
Dow Global Technologies, Inc., EP Appln. No. 06814361.9-1211, Response dated May 22, 2009.
Dow Global Technologies, Inc., EP Appln. No. 06814361.9-1211, Second Rejection dated Feb. 19, 2010.

METHOD TO ADJUST THE ELONGATION REQUIRED TO EFFECT A COLOR CHANGE IN POLYMERIC STRETCH FILMS INCORPORATING MECHANOCHROMIC DYES

FIELD

The present invention relates to films having a practical indication of the film tension applied to a unitized load, and therefore of its integrity during transportation, by using a stretch film incorporating mechanochromic dyes. The dye allows a color change to be observed upon different levels of elongation of the film, thereby providing a visual indication to help ensure the optimum level of stretch is being used when using the stretch film for securing product. The density of the film layer containing the mechanochromic dye can be adjusted to manipulate the tension under which the film undergoes the color change, thereby allowing the film to be tuned to a particular application.

BACKGROUND AND SUMMARY

Stretch films or stretch wrap, are highly stretchable plastic films that are wrapped around items in order to protect the item and/or in order to bundle smaller items into one larger unit. The stretch films provide a film around one or more products in order to stabilize, protect and help secure the cargo from tampering or theft. Typically stretch films are made of polyolefin materials such as linear low density polyethylene ("LLDPE") low density polyethylene ("LDPE"), ethylene vinyl acetate copolymers ("EVA") or polypropylene ("PP"), due to their balance of properties including elasticity.

These stretch films are frequently used to unitize pallet loads but also may be used for bundling smaller items. In practice, machine stretch films are elongated to 250-350% as they are wrapped around the goods and the elastic recovery of the stretch films keeps the items tightly bound. As such elongation levels are difficult to achieve by hand, many films intended for handwrapping are preoriented. Pre-orientation involves using a machine to stretch the film to about 250% to 300% elongation, while creating another roll of film (the pre-oriented roll). This new pre-oriented roll still has some level of stretchability left in it, typically on the order of 15 to 30% further elongation. A person using the pre-oriented roll for hand wrapping would only need to stretch the film by this additional amount in order to achieve a good holding force.

Whether machine wrapping or hand wrapping a load, the elongation should be optimized, as if the film is not elongated sufficiently, the film may slough off of the package or the goods may shift and break free during transportation, whereas if the elongation is too high, the goods may become damaged from the pressure imparted by the film and/or increased rates of film breakage will be observed. Unoptimized stretching is more common when handwrapping a load, due to the variability of human users. However, automatic equipment is costly, requires more space, and is not well suited to non-uniform loads, and so is not universally used. Therefore, manually stretched films currently account for approximately 35% and 50% of the total stretch film market in North America and Europe respectively. Multilayer stretch films allow different functionality to be imparted to the films than would be obtainable using monolayer films. For example, cling layers, barrier layers, and/or layers with specific physical properties such as puncture/tear/abuse resistance may be combined with layers formulated for their elastic properties to provide superior films. These multilayer films tend to be more expensive, however, heightening the importance of avoiding waste. The present disclosure helps to address the lack of standardization (particularly in manual pallet wrapping) by providing a feature in the stretch film that actively interacts with the operator during the application process to provide a visual indication as to the level of elongation. This visual indication can be achieved through the use of a mechanochromic dye. Mechanochromic dyes undergo a change in their optical properties as a result of mechanical stimulus, which may include tension, compression or ultrasonic stimuli. These optical property changes may result from either a chemical change within the dye (for example, scission of chemical bonds) or a physical change in the dye assembly (for example changes in molecular packing of dye molecules). Specifically, a segment of mechanochromic dyes have the property of aggregation induced emission (AIE), which means that their optical properties are governed by their level of molecular aggregation in a solvent or film.

The film can be tailored to maximize the visual indication at the desired elongation. Previous work has disclosed that mechanochromic dyes can be used as elongation indicators in stretch film, particularly when used in applications involving securing pallet loads manually. Without intending to be bound by theory, it is believed that when the dyes are incorporated into the stretch film, it results in the formation of dye aggregates, which have a particular color. As the film is elongated, the dye aggregates are broken up, yielding a different film color. This color change is believed to be possible because an aggregated dye state typically gives rise to the formation of excimers, which possess different optical properties than individual dye monomers. Elongation of the film breaks up the dye aggregates into individual monomers, thereby altering its optical properties.

While this technique has proven to be useful, it would be beneficial to have more ability to control the elongation required to result in a color change so that film could be produced which exhibits a color change at the precise level of stretching desired for different applications. For example, as Pre-stretched films (premium stretch films) require stretching above 250% elongation, while conventional stretched films (commodity stretch films) require stretching to 25-75% film elongation, it would be beneficial to have stretch films which exhibit a color change at about 250% elongation and other films which exhibit a color change at about 50% elongation.

The degree of elongation which results in the color change was previously viewed as a function of amount and the identity of the particular mechanochromic dye used. It has been discovered that the density of the film layer which contains the mechanochromic dye also plays a role. This is believed to be because as the density is lowered, there is lower polyethylene crystallinity, meaning that there is more volume in which the dye molecules may reside. This, in turn, results in a smaller number of dye aggregates for the same amount of dye, and therefore a reduced amount of elongation required to break up the aggregates sufficiently to allow for transition from one color to the next.

Additionally, the ability to decouple dye-aggregation and total dye concentration by varying the density of the film, or at least the layer of film which contains the mechanochromic dye (i.e. the "indicator layer"), may provide the following benefits: First, it may allow for a change in the elongation necessary for a color change, without changing the dye concentration, which saves material costs and ensures process simplification. Second, it may allow for thinner film gauges without compromising the visual intensity and color transition characteristics of the dye by both increasing the dye concentration and using a low density indicator layer. Finally, films of different colors with the same color intensity can be achieved by using an indicator layer, which is difficult to achieve with mechanochromic AIE dyes. Accordingly, in one aspect, the present disclosure relates to a method to adjust the amount of elongation required to effect a color change in a polymer stretch film having a first layer made from a polyolefin resin and an AIE mechanochromic dye dispersed within the first layer. The method comprises selecting a polyolefin resin having a given density and admixing a given amount of the AIE mechanochromic dye into a melt of the polyolefin resin. Then a film of a desired thickness intended for use is made from the polyolefin resin containing the mechanochromic dye. This film is then elongated and the level of elongation needed to effect the color change (or changes) is observed. Finally the density of the polyolefin resin in the layer containing the AIE-mechanochromic dye is adjusted to change the amount of elongation needed to effect the color change in the film to the desired level.

Benefits of this concept when applied to manual pallet wrapping include improving overall quality of wrapping and load security, quality control, and can also aid in the identification of loads which may have been subjected to tampering.

DETAILED DESCRIPTION

Figure 1:
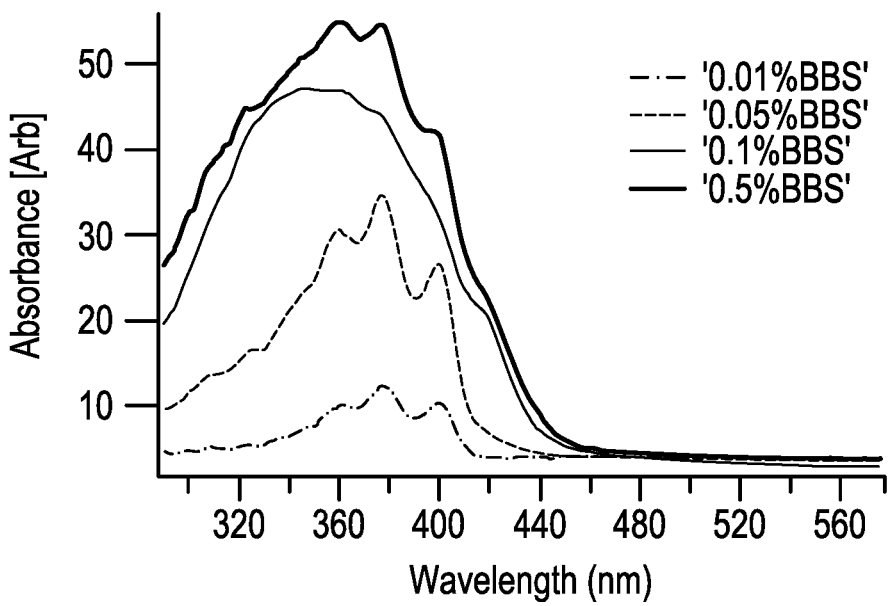
FIG. 1 shows the absorbance spectra of polyethylene film with various levels of 4,4'-bis(2-benzoxazolyl)stilbene.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which in the present disclosure refers to polymers prepared from two or more different monomers (i.e., for purposes of the present invention the term "copolymers" is used to generically mean polymers made from at least two different monomers and therefore includes what those skilled in the art might refer to as "terpolymers" as well as polymers made with more than three different monomers).

"Polyolefin" shall mean polymers comprising greater than 50% by weight of units which have been derived from alpha-olefins, and in particular alpha olefins having from 2-8 carbon atoms, including polyethylene and polypropylene. "Polyolefin resin" includes polyolefin-based polymers made in a single reactor with similar reactor conditions, as well as in-reactor blends (that is, bi-modal polyolefin-based polymers made in the same train but under different conditions) and post reactor blends of two or more polyolefin-based polymers each having independent characteristics.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); Medium Density Polyethylene (MDPE) and High Density Polyethylene (HDPE). Molecular weight of the polymer, which can be expressed as average values (Mn, Mw, Mz where Mn is number average molecular weight, Mw is weight average molecular weight and Mz is Z average molecular weight), is correlated to the polymers melt index as determined according to ASTM D 1238 (2.16 kg, 190° C.).

These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm$^3$.

The term "LLDPE" or "Linear Low Density Polyethylene", includes both resin made using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The Linear PE can be made via gas-phase, solution-phase or slurry polymerization or any combination thereof, using any type of reactor or reactor configuration known in the art, with gas and solution phase reactors being most preferred.

The term "HDPE" or High Density Polyethylene is sometimes used to refer to polyethylenes having densities greater than about 0.940 g/cm$^3$, which are generally prepared with Ziegler-Natta catalysts, chrome catalysts or even metallocene catalysts. Similarly "MDPE" or Medium Density Polyethylene is sometimes used to refer to the subset of polyethylenes which have a density in the range of from about 0.926 to about 0.940 g/cm$^3$).

The following analytical methods are used in the present invention:

Density is determined in accordance with ASTM D-792.

"Melt index" also referred to as "I$_2$" (or "MFR" for polypropylene resins) is determined according to ASTM D-1238 (for polyethylene resins 190° C., 2.16 kg; for polypropylene resins 230° C., 2.16 kg).

In one aspect of the present disclosure, a method to adjust the amount of elongation required to effect a color change in a polymer stretch film is provided. The method comprises selecting a polyolefin resin having a given density; admixing a given amount of the AIE mechanochromic dye into a melt of the polyolefin resin; making a film of a desired thickness from the polyolefin resin containing the mechanochromic dye; determining the level of elongation needed to effect a color change in the resulting film; adjusting the density of the polyolefin resin to change the level of elongation needed to effect the color change to the desired level.

In a second aspect of the present disclosure, a method is provided to match the amount of elongation required to effect a color change in a polymer stretch film comprising at least a first layer comprising a polyolefin resin and an AIE mechanochromic dye dispersed within the first layer with a desired amount of elongation for an intended application for the stretch film. This aspect of the present invention comprises first, determining the level of elongation needed to effect a color change in the resulting film based on the intended application for the film. Then a polyolefin resin is selected for use in the first layer, said polyolefin resin having a given density based on expected level of elongation needed to effect a color change in the resulting film. A given amount of the AIE mechanochromic dye is then admixed into a melt of the polyolefin resin. A film is then made comprising at least a first layer which is made from the polyolefin resin containing the mechanochromic dye. Optionally, if color change does not occur at the desired level of elongation for the resulting film, adjusting the density of the polyolefin resin in the first layer to change the level of elongation needed to effect the color change to the desired level and/or other factors such as the amount of dye, or type of dye or the thickness of the first layer.

The method can include the step of inputting one or more factors selected from the group consisting of the density of the polyolefin resin, the identity of the AIE mechanochromic dye, the amount of the AIE mechanochromic dye, the thickness of the first layer and the elongation required to effect a color change into database. The database can then be used to predict the combination of factors required to produce a color change at a desired elongation level. As additional films are prepared varying this or additional factors, the predictive ability of the database will improve.

First Layer

Any polyolefin resin generally known in the art as being suitable for use in stretch film applications may be used in the first layer of the present disclosure. The polyolefin resin preferably is comprised of greater than 70%, 80% or even 90% by weight of units which have been derived from alpha-olefins, and in particular alpha olefins having from 2-8 carbon atoms. Preferred polyolefins for use in the present disclosure include polyethylene, including LDPE, LLDPE, MDPE, and HDPE and polypropylene, including homopolymer polypropylene (h-PP), random copolymer polypropylene (RPP) and impact copolymer polypropylene (ICP).

In some embodiments the polyolefin comprises a linear low density polyethylene (LLDPE). The LLDPE suitable for stretch film application may advantageously have a density in the range of from 0.900 to 0.930 g/cm3. All individual values and subranges from 0.900 to 0.930 g/cm3 are included herein and disclosed herein; for example, the density can be from a lower limit of 0.900, 0.905, 0.908, 0.910, or 0.914 g/cm$^3$ to an upper limit of 0.919, 0.920, 0.925, or 0.930 g/cm$^3$.

The linear low density polyethylene compositions useful in the instant disclosure may advantageously have a melt index ($I_2$) in the range of from 0.3 to 10.0 g/10 minutes. All individual values and subranges from 0.3 to 10 g/10 minutes are included herein and disclosed herein; for example, the melt index ($I_2$) can be from a lower limit of 0.3, 0.6, 0.7, 1.0, 1.5, 2.0, 3.0 g/10 minutes to an upper limit of 4.0, 5.0, 8.0, 10.0 g/10 minutes.

The linear low density polyethylene compositions useful in the instant disclosure may comprise less than 35 percent by weight of units derived from one or more α-olefin comonomers other than ethylene. All individual values and subranges from less than 35 weight percent are included herein and disclosed herein; for example, the linear low density polyethylene composition may comprise less than 25 percent by weight of units derived from one or more α-olefin comonomers; or in the alternative, the linear low density polyethylene composition may comprise less than 15 percent by weight of units derived from one or more α-olefin comonomers; or in the alternative, the linear low density polyethylene composition may comprise less than 14 percent by weight of units derived from one or more α-olefin comonomers.

The α-olefin comonomers typically used in LLDPE's suitable for use in the present disclosure typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The linear low density polyethylene composition suitable for use in the present disclosure may comprise at least 65 percent by weight of units derived from ethylene. All individual values and subranges from at least 75 weight percent are included herein and disclosed herein; for example, the linear low density polyethylene composition may comprise at least 85 percent by weight of units derived from ethylene; or in the alternative, the linear low density polyethylene composition may comprise less than 100 percent by weight of units derived from ethylene.

Any conventional ethylene (co)polymerization reaction may be employed to produce such linear low density polyethylene compositions. Such conventional ethylene (co)polymerization reactions include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. For example, the linear low density polyethylene composition may be produced via gas phase polymerization process in a single gas phase reactor; however, the production of such linear low density polyethylene compositions is not so limited to gas phase polymerization process, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

Suitable LLDPE polymers for use in the present disclosure include those commercially available from The Dow Chemical Company (for example, DOWLEX™ DOWLEX GM™, ELITE™, ELITE AT™, INNATE™, ATTANE™ and AFFINITY™ resins).

In addition to LLDPE, other polyethylenes suitable for use in the present disclosure include low density polyethylene(s) (LDPE), particularly when blended with LLDPE. Such blends may comprise from less than 30 percent by weight of one or more low density polyethylene(s) (LDPE); for example, from 2 to 25 weight percent; or in the alternative, from 5 to 15 weight percent. The low density polyethylene preferably has a density in the range of from 0.915 to 0.930 g/cm$^3$; for example, from 0.915 to 0.925 g/cm$^3$; or in the alternative, from 0.918 to 0.922 g/cm$^3$. The low density polyethylene preferably has a melt index (I2) in the range of from 0.1 to 5 g/10 minutes; for example, from 0.5 to 3 g/10 minutes; or in the alternative, from 1.5 to 2.5 g/10 minutes. The low density polyethylene preferably has a molecular weight distribution (Mw/Mn) in the range of from 6 to 10; for example, from 6 to 9.5; or in the alternative, from 6 to 9; or in the alternative, from 6 to 8.5; or in the alternative, from 7.5 to 9.

If LDPE is present as a blend with LLDPE, the blend composition may be prepared via any conventional melt blending process such as extrusion via an extruder, e.g. single or twin screw extruder. The LDPE, LLDPE, and optionally one or more additives may be melt blended in any order via one or more extruders to form a uniform blend composition. In the alternative, the LDPE, LLDPE, and optionally one or more additives may be dry blended in any order, and subsequently extruded to form a stretch film.

Polyolefin polymers other than polyethylenes can also be advantageously used in the present invention, and in particular polypropylene polymers and olefin block copolymers (OBCs) may be used. Propylene polymers include polypropylene homopolymer and copolymers, including random and impact copolymers, such as propylene/ethylene copolymers and are particularly well suited for use in the present invention. Propylene polymers having a 2 percent secant modulus, as measured by ASTM D 882, of about 150,000 psi and less are preferred. Propylene polymers also include the family of resins know as propylene based plastomers and elastomers (PBPE) which family includes those commercially available from ExxonMobil (VISTAMAXX™) and The Dow Chemical Company (for example, VERSIFY™).

Olefin block copolymers are a relatively new class of block copolymers. The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. Olefin block copolymers involve block copolymers made from olefins. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalysts. Olefin block polymers include those with ethylene as the dominant comonomer as well as those with propylene as the dominant monomer. Such materials are commercially available from The Dow Chemical Company under the INFUSE™ and INTUNE™ trade names.

Other resins known for use in stretch film applications may also be used with polyolefins in the first layer of the present invention, including ethylene vinyl acetate copolymers ("EVA"), ethylene ethyl acrylate copolymers ("EEA"), ethylene acrylic acid copolymers ("EAA"), ethylene methyl acrylate copolymers ("EMA") and ethylene n-butyl acrylate copolymers ("EnBA").

Additional Layer(s)

In addition to the first layer comprising a polyolefin resin described above, the stretch films of the present disclosure also comprise one or more additional layers. The additional layers, if any, should be chosen so as not to unduly interfere with the stretchable nature of the stretch films.

These additional layers may advantageously be used to impart additional functionality to the film. For example, additional layers may be added to provide cling, barrier properties or additional physical properties such as puncture resistance, tear resistance or abuse resistance may be used in the present invention. These layers may comprise one or more different polymers as is generally known in the art. These include polyolefins which may be of the same types as described for the first layer so long as in any specific film it is a different composition than that which is used in the first layer (i.e., the layers must be distinguishable, such as by using optical microscopy or other methods known in the art). Other materials for these additional layers can be, for example, polyamides (nylon), ethylene-vinyl alcohol copolymers, polyvinylidene chloride, polyesters and their copolymers such as polyethylene terephthalate, ethylene-vinyl acetate copolymers, ethylene-acrylic acid copolymers, ethylene-methacrylic acid copolymers, graft modified polymers, styrenic block copolymers In some multilayer structures where a desired layer is not completely compatible with the first layer, an adhesion-promoting tie layer, such as PRIMACOR™ ethylene-acrylic acid copolymers available from The Dow Chemical Co., and/or ethylene-vinyl acetate copolymers may be desirable.

Mechanochromic Dye

Stretch films of the present disclosure further include one or more mechanochromic dyes. The optical properties of mechanochromic dyes are controlled by their molecular arrangement or aggregation in a particular media (solid state, solvent, or film). Mechanical stimuli, such as tension, compression or ultrasonic stimuli, can alter this molecular assembly thereby directly modulating the optical properties.

These optical property changes may result from either a chemical change within the dye (e.g. scission of chemical bonds) or a physical change in the dye assembly (e.g. changes in molecular packing of dye molecules). Of particular interest in the present disclosure are mechanochromic dyes which exhibit the property of aggregation induced emission ("AIE").

In this disclosure, the dyes are incorporated into the stretch film matrix and the aggregation level of the dye in the film can be "tuned" by the dye concentration, in addition to the density of the resin in which the AIE mechanochromic dye is admixed. When the film is stretched, the aggregation (i.e. concentration) of the dye changes, leading to a change in the color of the film. By optimizing the selection of the dye as well as the dye concentrations, the color changes can be correlated to the amount of stretch desired for intended applications, such as pallet wrapping. Furthermore, the optimized dye concentrations are generally fairly low, allowing the stretch film to maintain their visual transparency. This is particularly true when mechanochromic dyes are used that show minimal change under natural light. Films incorporating such dyes may be exposed to an external light source such as a UV light to enhance the color change. It is also contemplated that the films may be exposed to multiple light sources such as natural light in addition to a UV light source.

Any mechanochromic AIE dye known in the art may be used in the present disclosure. Examples of mechanochromic dyes which may be used in the present disclosure include bis(benzoxazolyl)stilbene, perylene bisimide derivatives, cyano substituted oligomers of (p-phenylene-vinylene)s, etc. Although not intending to be bound by theory, in general when choosing a mechanochromic dye, the following relationship should be considered: the less likely a dye is to aggregate, the better chance it has as existing as single isolated molecules and therefore, the greater the differentiation in its optical properties between the aggregated and single molecular state at typical dye concentrations. As molecules with more and bulkier side groups tend to disrupt molecular packing (making them less likely to aggregate), these types of dyes tend to be preferred for use as a color changing dye. For example, 3,4,9,10-perylenetetracarbxylic diimide (PTCDI) is less preferred than perylene-3,4,9,10 tetracarboxylic acid bis(propylimide (PTCDI-T) which is less preferred than N,N"-Bis(3-pentyl)perylene-3,4,9,10-bis(dicarbooximide) (PTCDI-3P), three similar perylene bisimide derivatives differing by end groups, and therfore their tendency for molecular aggregation.

Further it may be desirable to use multiple dye types (both mechanochromic and non-mechanochromic) in order to generate the desired color effect.

The concentration of the dye should be high enough to promote at least one aggregated phase that has a different optical property than the dilute phase in the intended environment of the resulting stretch film. It should be understood that the ability to form aggregates will vary according to the specific dye selected and the environment in which it is incorporated. The optimum concentration of any given dye can be tuned to the ideal film elongation, thereby producing color change during stretching at the desired level (i.e. the dye aggregation should be broken up by the mechanical stimulus of elongation at the desired level). The specific concentration used therefore, will depend on a combination of factors including the particular dye used, the density of the matrix of the film in which the dye is incorporated, the thickness of the layer in which the dye is incorporated and the desired level of elongation of the film during use. Typical concentration of the mechanochromic dyes are in the range of from at least 0.0001, 0.001, or 0.01 up to 1, 0.5, or 0.1 percent by weight of the film layer containing the dye, with at least about 0.0001 percent dye by weight of the overall film.

The mechanochromic dye may be incorporated in any layer of the film. As each layers has a different crystalline structure, and each layer responds differently to elongation, the persons of ordinary skill in the art will understand that certain layers may be more desirable than others to allow for the aggregation of the mechanochromic AIE dyes to be disrupted upon the desired level of elongation. For the dye to be visible (either under natural light or using an external source such as an ultra violet light), the dyes should be incorporated in layer which is not opaque or which is not encapsulated by any opaque layers. In some applications, the mechanochromic dye will be incorporated into both the first layer comprising a polyolefin resin, of the stretch films of the present disclosure as well as one or more additional layers.

Overall Film Structure

The film structures of the present disclosure may comprise any number of layers desired. Films having two, three, five, seven, nine layers or more are known in the art and can be used in the present disclosure. It is also contemplated that some of the layers may be microlayers.

The thickness of each layer of the film, and of the overall film, is not particularly limited, but is determined according to the desired properties of the film. Typical film layers have a non-preoriented thickness of from 5 to 200 µm, more typically from 8 to 100 or even 25 µm (and of course these can be even smaller when microlayer technology is used), and typical films have an overall thickness (non-preoriented) of from 5 to 300 µm, more typically 10 to 100 µm.

The layers of the stretch films useful for the present invention may further comprise additional additives. Such additives include, but are not limited to, one or more hydrotalcite based neutralizing agents, antistatic agents, color enhancers, additional dyes or pigments (so long as such additional dyes are pigments do not prevent the color change from being observed), lubricants, fillers, pigments, primary antioxidants, secondary antioxidants, processing aids, UV stabilizers, nucleators, and combinations thereof. The inventive polyethylene composition may contain any amounts of additives. The linear low density polyethylene composition may comprise from about 0 to about 10 percent by the combined weight of such additives, based on the weight of the linear low density polyethylene composition including such additives. All individual values and subranges from about 0 to about 10 weight percent are included herein and disclosed herein; for example, the linear low density polyethylene composition may comprise from 0 to 7 percent by the combined weight of additives, based on the weight of the linear low density polyethylene composition including such additives; in the alternative, the linear low density polyethylene composition may comprise from 0 to 5 percent by the combined weight of additives, based on the weight of the linear low density polyethylene composition including such additives; or in the alternative, the linear low density polyethylene composition may comprise from 0 to 3 percent by the combined weight of additives, based on the weight of the linear low density polyethylene composition including such additives; or in the alternative, the linear low density polyethylene composition may comprise from 0 to 2 percent by the combined weight of additives, based on the weight of the linear low density polyethylene composition including such additives; or in the alternative, the linear low density polyethylene composition may comprise from 0 to 1 percent by the combined weight of additives, based on the weight of the linear low density polyethylene composition including such additives; or in the alternative, the linear low density polyethylene composition may comprise from 0 to 0.5 percent by the combined weight of additives, based on the weight of the linear low density polyethylene composition including such additives.

The film structures of the present disclosure may be made by conventional fabrication techniques, for example simple blown film (bubble) extrusion, biaxial orientation processes (such as tenter frames or double bubble processes), simple cast/sheet extrusion, coextrusion, lamination, etc. Conventional simple bubble extrusion processes (also known as hot blown film processes) are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing processes such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the film structures of this invention.

The stretch films of the present invention should be suitable for use in stretch film applications. Thus the films of the present invention should have adequate physical properties such as Ultimate Tensile (ASTM D882), Elongation % (ASTM D882), Tear Resistance (ASTM D1922), Dart Drop (ASTMD1709), and pre-stretch elongation at break (Highlight method). While such values will vary depending on intended use and thickness of the films, for a film 20 micron film (0.8 mil), it is preferred that the stretch film have an Ultimate Tensile in the machine direction ("MD") of at least 6000 psi, and in the cross direction ("CD") of at least 4500 psi. Similarly, it is preferred that such film has an elongation in the MD of at least 300%, and in the CD of at least 400% (prior to any pre-orientation). Tear Resistance can be greater than about 75 grams in the MD and 250 grams in the CD. Such film also preferably has a dart drop pf greater than 50 grams, and a pre-stretch elongation at break of at least 250%. The stretch films of the present invention can be characterized by their color (as well as the color change during use). Of key importance to the present invention is the qualitative ability to observe a change in color. Color can be quantified using Absorption/Emission Spectroscopy or a colorimeter. Absorption or emission spectroscopy can be used with the appropriate light or excitation source and spectrophotometer. Quantifiable color data may be obtained via analysis of intensity per given wavelength and/or by analysis of curve shape, with the appropriate baseline subtraction, as is generally known in the art. Typical spectral analysis range may be 250-800 nm.

Color of film may be measured by ASTM E1164-12e1, "Standard Practice for Obtaining Spectrometric Data for Object-Color Evaluation. As described in the methodology description, the fundamental procedure for evaluating the color of a reflecting or transmitting object is to obtain spectrometric data for specified illuminating and viewing conditions, and from these data to compute tristimulus values based on a CIE (International Commission on Illumination) standard observer and a CIE standard illuminant For example, a standard Illuminant D65 can be used to represent average daylight including the UV wavelength region. Other standard illuminants may be used to represent other color temperatures such as F11 fluorescent.

CIE L*a*b* (CIELAB) is a color space specified by the International Commission on Illumination in 1976 produced from tristimulus values X,Y,Z. In this space, every color is described by three components: L*—lightness, where 0 means black, and 100 is the maximum light intensity which is still visible without causing eye damage; a*—color in the green÷red field (−128,+127), b*—color in the blue÷yellow field (−128, +127). In the middle (a*=0, b*=0) only gray values exist. In this space, all the colors that are visible and distinguishable for the human eyes can be represented.

Differences between two color values in this CIELAB color space may be calculated by formulas (see W. Mokrzycki and M. Tatol, ResearchGate.net publication 236023905) such as $$\Delta E_{Lab} = SQRT[(\Delta L^*)^2 + (\Delta a^*)^2 + (\Delta b^*)^2]$$

where values of ΔE of >5 or >3 or even >2 have been correlated to perceptible color difference experimentally (see ref). It is preferred that the color change observed during wrapping at the desired level of elongation be perceptible, and thus have a ΔE $L_a$b of at least 2, preferably 3, and more preferably 5.

In use, the stretch films of the present disclosure can be used to facilitate proper amount of stretching when using the films to wrap by hand. To achieve this, a polyolefin resin suitable for stretch films is first selected, such film having a given density and other physical parameters. Then a mechanochromic dye capable of agglomeration in an unstretched film made from the polyolefin resin is selected. The mechanochromic dye is then combined with the polyolefin resin, by admixing or other means. A film is then made which includes at least one layer comprising the polyolefin films with the mechanochromic dye. The film may be mono-layer but is preferably a multi-layer film, where the additional layers provide additional properties as is generally known in the art. Such film will exhibit a first color when exposed to certain lighting (for example natural lighting, fluorescent lighting, and/or under a UV light). Upon elongation, one or more a color changes will occur at a certain level elongation(s). This level(s) can be observed by the user, and if a different level of elongation is desired, the density of the polyolefin resin used to form the melt in which the AIE mechanochromic dye is admixed can be adjusted. This adjustment can be accomplished by choosing a different starting polyolefin resin having the desired density, or by blending a compatible resin having a different density with the original resin in an amount to result in the desired density. While not intending to be bound by theory it is believed that in general, the lower the density of the polyolefin resin, the lower the crystallinity, which results in more mobility of the dye molecules making it harder to form aggregates. On the other hand, if the density is too high, there may be insufficient space to form dye aggregates (particularly with thin gauged film layers), and those that are formed may not be easily dispersed upon elongation. Thus the density should be selected to allow aggregates to be present at the initial state, but to have the aggregates be dispersed at the desired level of elongation.

Once the film has been tailored for a particular application, the user then wraps an object using the film, ensuring that the film is stretched to a point where a color change in the film is observed under the given lighting. By tailoring the amount of dye, the type of dye, the density of the matrix which contains the dye, and the thickness of the matrix which contains the dye, the color change can be adjusted to happen at different levels of elongation. Thus, the film producer can determine the optimum level of elongation of the film for use in particular applications, and tailor the dye package so that the color change is observed in the desired range of elongation and under the desired lighting conditions.

EXAMPLES

FIG. 1 shows absorption spectra of 4,4'-bis(2-benzoxazolyl)stilbene ("BBS") in an ethylene-octene linear low density resin having a density of 0.920 g/cm$^3$ and a melt index (190° C., 2.16 kg) of 1.0 g/10 min at different concentrations. It can be seen that at higher dye concentrations, the absorption peaks become poorly defined, believed to be due to the larger full width half maximums of the formed dye aggregates. Additionally, there is an increase in absorption between 410-460 nm, leading to the expression of a different color for the dye aggregates. It can also be seen from this absorption spectra that the absorption peaks have a greater intensity for the aggregated color (the curves having the higher dye concentration) than for the non-aggregated color (having lower dye concentration).

Figure 2:
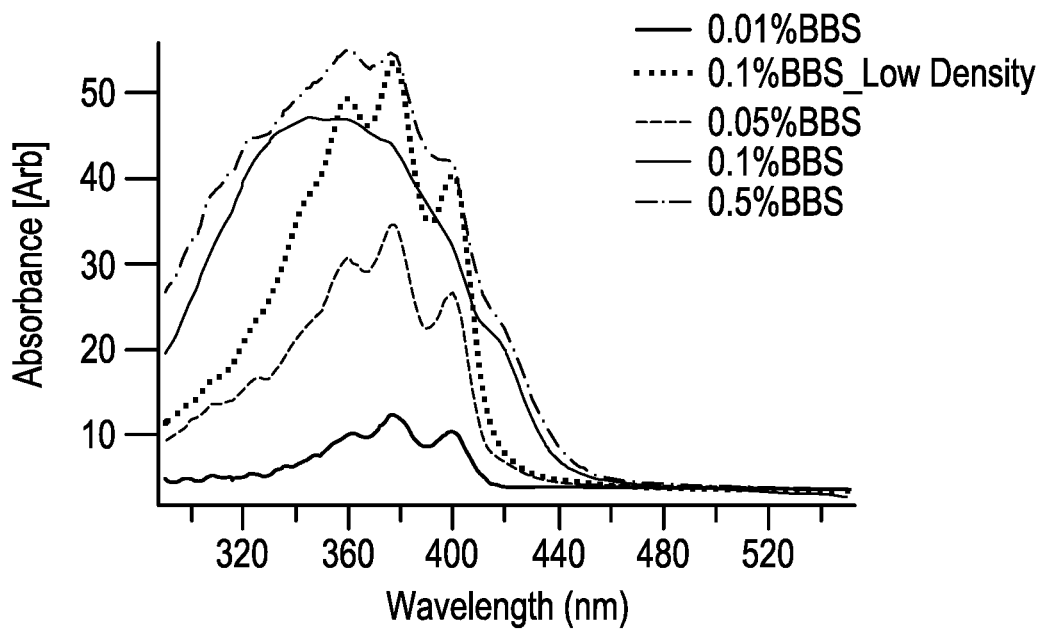
FIG. 2 shows the absorbance spectra of polyethylene film with various levels of 4,4'-bis(2-benzoxazolyl)stilbene, and one example with a lower density polyethylene film

FIG. 2 shows the same absorbance plot of FIG. 1, with the additional data of 0.1 wt % BBS in a lower density PE. The lower density PE was formed by blending same resin as above with 50 wt % of an ethylene-octene copolymer having a density of 0.87 g/cm$^3$, to give an overall blend density of 0.894 g/cm$^3$. Comparing the 0.1 wt % BBS in the low density PE (green curve) versus the standard PE (blue curve), it is clear that the former has well defined peaks, indicative of a non-aggregated dye state. Additionally, absorption in the 410-460 nm wavelength range is suppressed in the low density PE at the same dye concentration. These results demonstrate that the coupling of dye loading with aggregation can be broken by controlling the density of the layer. Furthermore, the maximum absorption intensities of the non-aggregated color (using 0.1 wt % in the low density PE) is similar to the aggregated color state (0.1 wt % and 0.5 wt % BBS in the standard PE). This additionally shows that the colored intensity can be tuned independent of the dye aggregated state.

Example—Indicator Layer in a Multilayer Stretch Film

This example demonstrates the basic concept of an indicator layer in a multilayer stretch film. First a mechanochromic AIE dye, 4,4'-bis(2-benzoxazolyl)stilbene ("BBS") (powder, Sigma Aldrich) is compounded into an ethylene-octene linear low density resin having a density of 0.920 g/cm3 and a melt index (190° C., 2.16 kg) of 1.0 g/10 min resin to form a 1% master batch film (MB-BBS) using a LabTech Twin Screw Extruder (5 lb/h. 200 rpm screw speed, 210° C. melt temperature). The compounded resin is then used to make film having a thickness of ~1 mil using a LabTech co-ex blown film line (430° F. melt temperature, 2.5 BUR, 20 lb/hr/in). Table 1 and 2 describes the resins and the composition of the films produced with the resins. The films produced represent a structure of a 3 layer co-ex stretch film. The density of the core layer (which in this case serves as the indicator layer) is varied for all four samples. The total amount of the BBS dye in the core layer of the various samples are kept constant at 0.2 wt. %.

TABLE 1

Resin description

| Resins | Density (g/cc) | MI (g/10 min) |
|---|---|---|
| Resin 1 | 0.92 | 1 |
| Resin 2 | 0.87 | 1.9 |
| Resin 3 | 0.962 | 0.85 |
| MB-BBS (1%) | | |

TABLE 2

Film description

| Films | Layer 1 (0.2 mil) | Layer 2 (0.6 mil) | Layer 3 (0.2 mil) |
|---|---|---|---|
| Film 1 | Resin 1 | 80% Resin 1 + 20% MB-BBS | Resin 1 |
| Film 2 | Resin 1 | 60% Resin 1 + 20% Resin 2 + 20% MB-BBS | Resin 1 |
| Film 3 | Resin 1 | 80% Resin 2 + 20% MB-BBS | Resin 1 |
| Film 4 | Resin 1 | 80% Resin 3 + 20% MB-BBS | Resin 1 |

Figure 3:
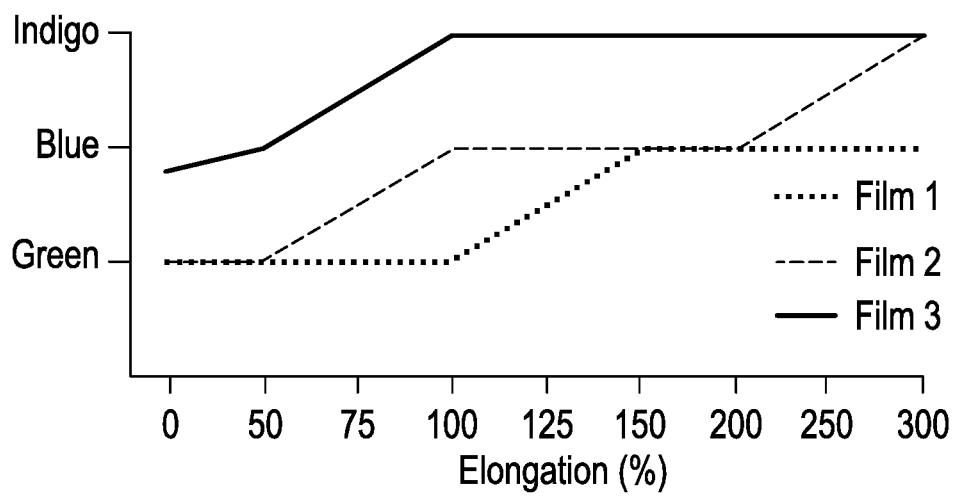
FIG. 3 is a graph showing the color transitions at different elongation of Films 1, 2, and 3 as reported in the Examples.

2 in×1.5 in strips from the above films are made and elongated (MD) to different extents by an instron (20%/sec stretch rate) and illuminated by UV-enhanced light (ambient light is not excluded). The color transition of Films 1, Films 2 and Films 3 (with decreasing Core layer film density) are presented qualitatively in FIG. 3:

The changing indicator layer density influences the color range spanned by the stretch film as it is stretched from 0-300% and also influences the approximate elongation at which one color switches to another. For Film 1 (high indicator/core layer density), the color switches from green to blue at between 100-150% elongation. For Film 2 (intermediate indicator/core layer density), the color switches from Green to Blue between 50-100% elongation, and the transition to indigo continues to occur at 200-300% elongation. For Film 3 (low core layer density), the transition from green to blue occurs at <50%, and the transition to indigo occurs from 50-100% elongation. The above example demonstrates that an indicator layer can tune both the color transition point and the color range spanned during stretching.

Figure 4:
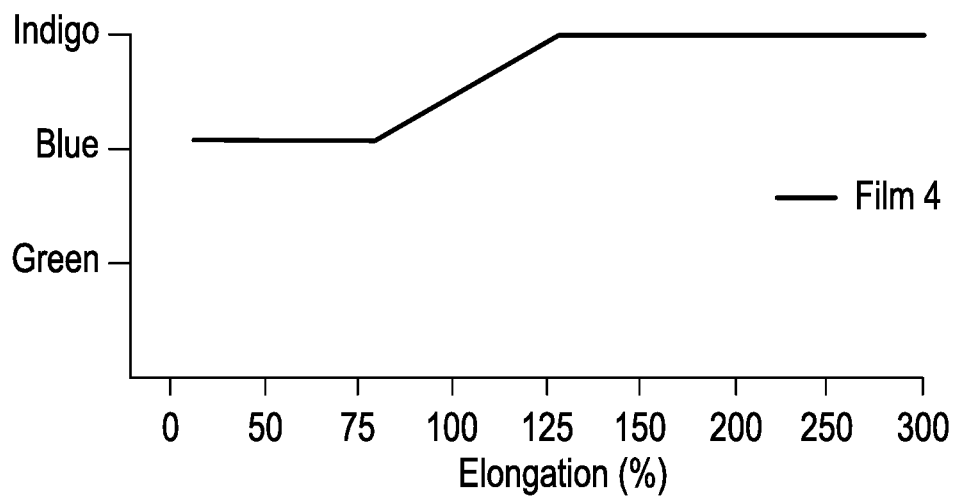
FIG. 4 is a graph showing the color transitions at different elongation of Film 4 as reported in the Examples.

If the indicator layer density is too high, there would both be insufficient space for the dye molecules to reside in, and limited mobility of the dye molecules to form aggregates due to the high PE crystallinity. This will pose a significant barrier to the formation of dye aggregates, and would therefore limit the color range spanned during stretching from blue to indigo. See FIG. 4 for Film 4. In this case, the transition from blue to indigo in Film 4 occurs around 100% elongation.

The results for all four films are summarized in Table 3 below:

TABLE 3

Summary of film transitions

| Elongation (%) | Film 1 | Film 2 | Film 3 | Film 4 |
|---|---|---|---|---|
| 0 | Green | Green | Bluish | Blue |
| 50 | Green | Green | Blue | Blue |
| 100 | Green | Blue | Indigo | Blue/indigo |
| 150 | Blue | Blue | Indigo | Indigo |
| 200 | Blue | Blue | Indigo | Indigo |
| 300 | Blue | Indigo | Indigo | Indigo |

It is specifically intended that the present disclosure not be limited to the embodiments and illustrations contained herein, but include modified forms of those embodiments including portions of the embodiments and combinations of elements of different embodiments as come within the scope of the following claims. It is further contemplated that the limitations set forth in the following dependent claims may be combined with limitations in any other dependent claim, mutatis mutandis.

What is claimed is:

1. A method to adjust the amount of elongation required to effect a color change in a polymer stretch film comprising at least a first layer comprising a polyolefin resin and an AIE mechanochromic dye dispersed within the first layer, the method comprising the following steps:
   a. selecting a polyolefin resin having a given density;
   b. admixing a given amount of the AIE mechanochromic dye into a melt of the polyolefin resin;
   c. making a film comprising at least a first layer which first layer comprises the polyolefin resin containing the mechanochromic dye;
   d. determining the level of elongation needed to effect a color change in the resulting film;
   e. adjusting the density of the polyolefin resin in the first layer to change the level of elongation needed to effect the color change to the desired level.

2. The method of claim 1 wherein one or more factors selected from the group consisting of the density of the polyolefin resin, the identity of the AIE mechanochromic dye, the amount of the AIE mechanochromic dye, the thickness of the first layer and the elongation required to effect a color change are inputted in a database, and the database is used to predict the combination of factors required to produce a color change at a desired elongation level, and that that prediction is used to select the initial density of the polyolefin resin used in the first layer.

3. The method of claim 1 wherein the polyolefin resin is a polyethylene.

4. The method of claim 1 wherein the density of the polyolefin resin is adjusted by blending a second polyolefin resin having a density which is different than the first polyolefin resin in an amount to effect the desired change in overall density.

5. The method of claim 1 wherein the AIE mechanochromic dye is selected from the group consisting of bis(benzoxazolyl)stilbene, perylene bisimide derivatives, and cyano substituted oligomers of (p-phenylene-vinylene)s.

6. The method of claim 1 further comprising the step of admixing one or more additional dyes, which additional dyes may be AIE mechanochromic, non-AIE-mechanochromic, or non-mechanochromic.

7. The method of claim 1 further comprising the step of adjusting the quantity of the AIE mechanochromic dye to change the level of elongation needed to effect the color change to the desired level.

8. The method of claim 1 wherein the step of determining the level of elongation needed to effect a color change in the resulting film is facilitated with the use of a UV light source.

9. The method of claim 1 wherein the stretch film is a multilayer film.

10. The method of claim 9 wherein the stretch film has at least three layers and the first layer is a non-skin layer.

11. The method of claim 1 wherein the AIE mechanochromic dye is admixed into the polyolefin melt of the first layer in an amount of from 0.0001 to 1 percent by weight of the polyolefin melt.

12. The method of claim 11 wherein the AIE mechanochromic dye is admixed in an amount of from 0.01 to 0.1 percent by weight of the polyolefin melt of the first layer.

13. A method to match the amount of elongation required to effect a color change in a polymer stretch film comprising at least a first layer comprising a polyolefin resin and an AIE mechanochromic dye dispersed within the first layer with a desired amount of elongation for an intended application for the stretch film, the method comprising the following steps:
   a. determining the level of elongation needed to effect a color change in the resulting film based on the intended application for the film;
   b. selecting a polyolefin resin for use in the first layer, said polyolefin resin having a given density based on expected level of elongation needed to effect a color change in the resulting film;
   c. admixing a given amount of the AIE mechanochromic dye into a melt of the polyolefin resin;
   d. making a film comprising at least a first layer which is made from the polyolefin resin containing the mechanochromic dye;
   e. optionally, if color change does not occur at the desired level of elongation for the resulting film, adjusting the density of the polyolefin resin in the first layer to change the level of elongation needed to effect the color change to the desired level.

* * * * *